(12) United States Patent
Welch, Sr. et al.

(10) Patent No.: US 8,814,267 B2
(45) Date of Patent: Aug. 26, 2014

(54) VEHICLE SEAT TRIM PADDLE ATTACHMENT

(75) Inventors: Thomas A. Welch, Sr., Ortonville, MI (US); William Paruszkiewicz, Clinton Township, MI (US); James Clauser, Oakland Township, MI (US); Jeffrey Joseph Frelich, Commerce, MI (US); Paul S. Severinski, Brownstown, MI (US); Louella Patterson, Goodells, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/510,389

(22) PCT Filed: Jan. 28, 2011

(86) PCT No.: PCT/US2011/022855
§ 371 (c)(1),
(2), (4) Date: May 17, 2012

(87) PCT Pub. No.: WO2011/102951
PCT Pub. Date: Aug. 25, 2011

(65) Prior Publication Data
US 2012/0299360 A1 Nov. 29, 2012

Related U.S. Application Data

(60) Provisional application No. 61/304,987, filed on Feb. 16, 2010.

(51) Int. Cl.
*A47C 31/02* (2006.01)
(52) U.S. Cl.
CPC ................................ *B06N 2/5825* (2013.01)
USPC ............... 297/218.4; 297/218.2; 297/228.12; 297/226

(58) Field of Classification Search
USPC ............ 297/218.1, 218.2, 218.4, 228.12, 226
See application file for complete search history.

(56) References Cited

U.S. PATENT DOCUMENTS 4,609,226 A 9/1986 Yoshizawa
4,789,201 A 12/1988 Selbert
(Continued)

FOREIGN PATENT DOCUMENTS

| CA | 2558784 A1 | 10/2005 |
|---|---|---|
| CN | 101357599 A | 2/2009 |
| JP | 2000189271 A | 7/2000 |

OTHER PUBLICATIONS

PCT International Search Report and Written Opinion Dated Mar. 25, 2011, Applicant Lear Corporation, Application No. PCT/US2011/022855, 7 Pages.
(Continued)

*Primary Examiner* — Sarah B McPartlin
(74) *Attorney, Agent, or Firm* — Brooks Kushman P.C.

(57) ABSTRACT

Embodiments of the invention are generally directed to securing a trim cover to a vehicle seat cushion. In at least one embodiment, a seat cushion assembly comprises a foam cushion having an "A" surface, a "B" surface, and at least one slot extending therebetween, a trim cover extending over the foam cushion, and a trim cover attachment assembly secured to the trim cover for securing the trim cover adjacent the foam cushion. In at least one embodiment, the trim cover attachment assembly comprises a flexible sheet having a first end attached to the trim cover and a second end having a paddle that sits adjacent the "B" surface of the foam cushion, the fabric extending through the slot of the foam cushion.

14 Claims, 4 Drawing Sheets

(56) References Cited

U.S. PATENT DOCUMENTS

| | | |
|---|---|---|
| 5,820,213 A | 10/1998 | Severinski |
| 5,882,073 A | 3/1999 | Burchi et al. |
| 6,299,255 B1 * | 10/2001 | Pichon .................. 297/452.6 |
| 6,592,181 B2 * | 7/2003 | Stiller et al. ............. 297/218.2 |
| 6,899,399 B2 * | 5/2005 | Ali et al. ................. 297/452.6 |
| 7,134,730 B2 | 11/2006 | Flegal et al. |
| 7,560,939 B1 | 7/2009 | De et al. |
| 2007/0035165 A1 | 2/2007 | Zahel |
| 2008/0224509 A1 | 9/2008 | Demick |
| 2009/0033131 A1 | 2/2009 | Clauser et al. |
| 2009/0085384 A1 | 4/2009 | Galbreath et al. |
| 2009/0295215 A1 | 12/2009 | Galbreath et al. |

OTHER PUBLICATIONS

Chinese Office Action Dated Mar. 31, 2014, Application No. 2014032601475480, Applicant Lear Corporation, 9 Pages.

* cited by examiner

VEHICLE SEAT TRIM PADDLE ATTACHMENT

CROSS-REFERENCE TO RELATED APPLICATION

This application is a U.S. national phase of PCT Appln. No. PCT/US2011/022855, filed Jan. 28, 2011, which claims the benefit of U.S. provisional Appln. No. 61/304,987, filed Feb. 16, 2010, the disclosures of which are hereby incorporated by reference in their entirety.

TECHNICAL FIELD

This invention relates in general to a trim attachment assembly and method of attaching a trim cover to a seat cushion.

BACKGROUND

Vehicle seats generally include a seat back and a seat cushion or bottom. The seat back is commonly pivotally attached to the seat bottom. Each of the seat back and the seat bottom typically includes a framework, a cushion or padding connected to the framework, and a trim cover for decoratively covering and protecting the cushion. Typically, the cushion is made of an expandable foam material and is molded to a desired shape. Suitable examples of some trim cover materials include leather, polymers, and fabric. Often times, the trim cover is provided with a thin layer of padding, such as foam.

Various seat trim attachment assemblies are commonly used in the industry. One such type of attachment assembly is often referred to as a close out attachment wherein the attachment assembly is generally not readily visible and is commonly located along the underside of the seat back or bottom. Another type of attachment is referred to as a trench attachment wherein the attachment area is readily visible by the vehicle occupants. In this situation, such as in bucket-style seats, bench seats, and split bench seats, to name a few examples, the trench attachment is employed along the areas where the raised bolsters meet the recessed central seating and back sections, thereby creating a valley or trench where the trim material is secured to avoid the appearance of loose fitting trim material. The trench is often located at seam lines, and thus the seam is drawn slightly into the foam cushion of the seat.

SUMMARY OF THE INVENTION

In at least one aspect, the present invention relates to a seat cushion assembly for a vehicle. In this aspect, the cushion assembly comprises a foam cushion having an "A" surface, a "B" surface, and at least one slot extending therebetween, a trim cover extending over the foam cushion, and a trim cover attachment assembly secured to the trim cover for securing the trim cover adjacent the foam cushion. In at least this aspect, the trim cover attachment assembly comprises a flexible sheet having a first end attached to the trim cover and a second end having a paddle that sits against the "B" surface of the foam cushion, with the flexible sheet extending through the slot of the foam cushion In at least one embodiment, the trim cover attachment assembly comprises a first trim cover attachment assembly secured to the trim cover at a first location, with the cushion assembly further comprising a second trim cover assembly secured at a second location spaced from the first location. In at least this embodiment, the second trim cover assembly comprises a flexible sheet having a first end attached to the trim cover and a second end having a paddle that sits adjacent the "B" surface of the foam cushion, with the flexible sheet extending through a second slot of the foam cushion.

In at least another embodiment, the second end of the flexible sheet has a bead secured thereto, with the bead having a first width, the paddle having a paddle slot having a first portion having a second width and a second portion having a third width, with the third width being bigger than the first width and the second width and the first width being bigger than the second width but smaller than the third width.

In at least another aspect, the present invention relates to a trim cover assembly securable to a seat cushion assembly comprising a foam cushion having an "A" surface, a "B" surface, and at least one slot extending therebetween and a trench in communication with the slot. In at least this aspect, the trim cover assembly comprises a trim cover extendable over the foam cushion, and a trim cover attachment assembly secured to the trim cover for securing the trim cover adjacent the foam cushion, wherein the trim cover attachment assembly comprises a flexible sheet having a first end attached to the trim cover and a second end having a paddle that, when the trim cover is secured adjacent the foam cushion, sits against the "B" surface of the foam cushion, with the flexible sheet extending through the slot of the foam cushion.

In at least yet another aspect, the present invention relates to a method of attaching a trim cover to a foam cushion. In this aspect, the method comprises providing a foam cushion having an "A" surface, a "B" surface, and at least one slot extending therebetween, providing a trim cover having an underside and a top side, providing a trim cover attachment assembly comprising a flexible sheet having a first end, a second end, and paddle adjacent the second end of the flexible sheet, securing the first end of the flexible sheet to the underside of the trim cover, displacing the flexible sheet through the slot, and disposing the paddle on the "B" surface of the foam cushion such that the flexible sheet extends between the trim cover surface and the "B" surface of the foam cushion.

In at least one embodiment, the trim cover attachment assembly comprises a first trim cover attachment assembly secured to the trim cover at a first location, with the cushion assembly further comprising a second trim cover assembly secured at a second location spaced from the first location, with the second trim cover assembly comprising a flexible sheet having a first end attached to the trim cover and a second end having a paddle that adjacent the "B" surface of the foam cushion, and with the flexible sheet extending through a second slot of the foam cushion.

In at least another embodiment, the step of displacing the flexible sheet through the slot comprises passing the flexible sheet and the paddle through the slot and the step of disposing the paddle on the "B" surface comprises rotating the paddle after it passes through the slot to allow it to sit against the "B" surface.

In at least yet another embodiment, the second end of the flexible sheet has a bead secured thereto having a first width, with the paddle having a paddle slot having a first portion having a second width and a second portion having a third width, and with the third width being bigger than the first width and the second width and the first width being bigger than the second width but smaller than the third width.

In at least still yet another embodiment, the step of displacing the flexible sheet through the slot comprises passing the flexible sheet and the bead through the slot and the step of disposing the paddle on the "B" surface comprises passing the bead through the second portion of the paddle slot and displacing the bead against the first portion of the paddle slot and the paddle.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various alternative forms. The figures are not necessarily to scale, some features may be exaggerated or minimized to show details of particular components. Therefore, specific structural or functional details disclosed herein are not to be interpreted as limiting, but merely as a representative basis for the claims and/or a representative basis for teaching one skilled in the art to variously employ the present invention.

Moreover, except for otherwise expressly indicated, all numeral quantities in this description and in the claims indicating amounts or conditions are to be understood as modified by the word "about" in describing the broader scope of the invention. Practice within the numerical range as stated is generally preferred. Also, unless expressly stated to the contrary, percents, "parts of," and ratio values are by weight and the description of a group or class of materials as suitable or preferred for a given purpose in connection with the invention implies that mixtures of any two or more members of the group or class may be equally suitable and preferred.

Figure 1:
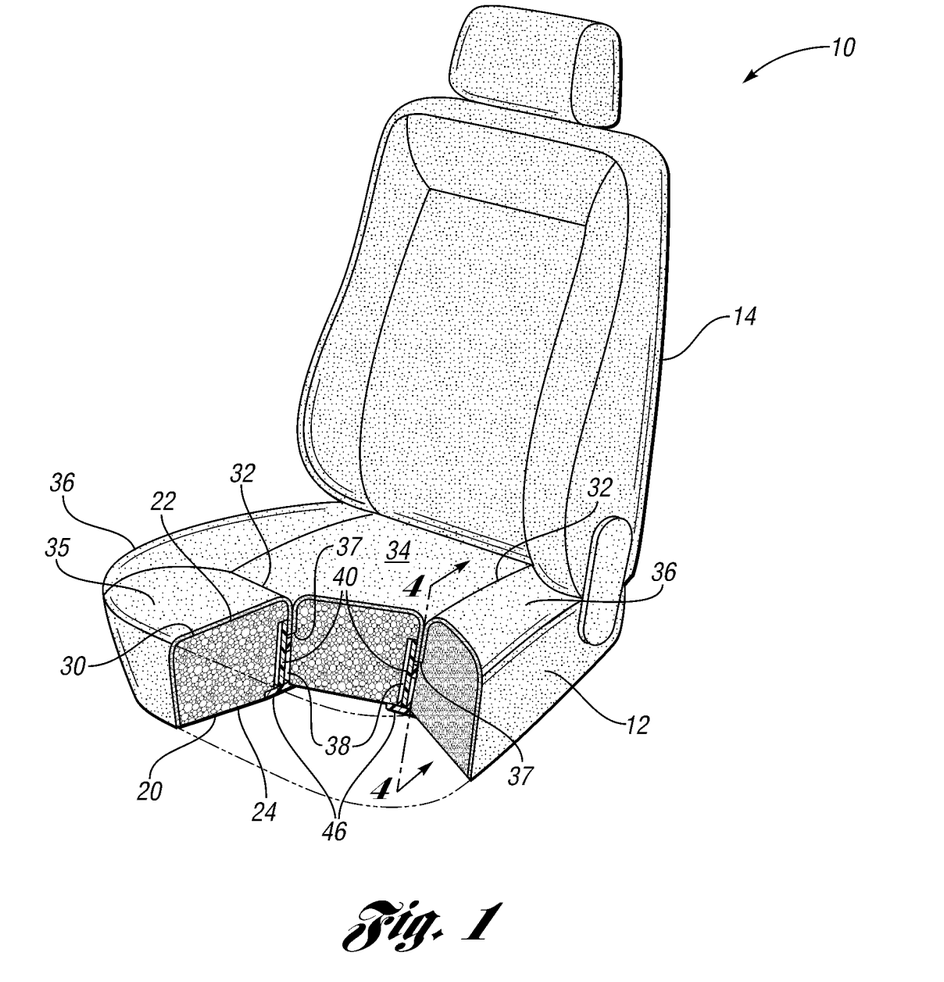
FIG. 1 is a perspective view of the seat assembly utilizing a trim attachment assembly, schematically shown, in accordance with at least one embodiment of the present invention.

Referring now to the drawings, there is illustrated in FIG. 1 an exemplary seat, indicated generally at 10. The seat 10 generally includes a seat bottom 12 and a seat back 14. The seat 10 is shown having a bucket type configuration but it should be understood that the seat 10 can have any desired structure and/or appearance, such as a bench or split bench seat. The seat bottom 12 and the seat back 14 may be made in a similar manner and for ease of description, only the formation of the seat bottom 12 will be described in detail below but is should be understood that the same may be used in assembling the seat back 14.

In at least one embodiment, the seat bottom 14 includes a framework (not shown) for supporting a foam cushion 20. The cushion 20 is preferably made of a foam material, such as an expandable polymer. The cushion 20 has a first or upper surface 22 and a second or lower surface 24 facing downward towards the floor the vehicle in which the seat 10 is installed.

The upper surface 22 and side portions of the seat bottom 14 are covered by a flexible trim cover 30. The trim cover 30 can be any suitable material for covering and protecting the upper surface 22. Examples of suitable material for the trim cover 30 include leather, vinyl or other polymers, cloth, and/or fabric. The trim cover 30 may have a layer of foam 31 (FIG. 4) on its underside. The trim cover 30 may be provided in separate sections which are sewn together to define seams 32 therebetween.

In the embodiment shown in FIG. 1, the trim cover 30 includes a central section 34, a front section 35, and side bolster sections 36 defined by seams 32 therebetween. As will be explained in detail below, at least one, and typically a plurality of trim attachment assemblies, schematically shown as 40, are used to attach the trim cover 30 to the cushion 20 in a manner so as to slightly draw the seams 32 inwardly into the cushion 20 to provide a pleasant overall appearance of the seat bottom 12.

The cushion 20 includes channels or trenches 37 formed therein such that the seams 32 may be inserted therein. In at least one embodiment, the trenches 37 are generally 2 to 12 mm in thickness or width, with width being measured from side to side, such as inboard side to outboard side, of the seat bottom 14. This width of trenches 37 is generally smaller than the conventional trenches which are typically 18 to 30 mm since they usually have velcro therein. In another embodiment, the trenches 37 are 3 to 10 mm in thickness, and in yet another embodiment, 4 to 6 mm. This decrease in width of trenches 37 relative to conventional trenches is accomplished at least in part due to the trim attachment assemblies 40, and corresponding slots 38, provided herein. For clarity, the width of the trenches 37 are shown enlarged but it should be understood that the trenches 37 may be smaller and may be simply spread apart when needed since the cushion 20 is preferably made of a flexible foam material capable of such deformation. In at least one embodiment, the trenches 37 are generally 15 to 70 cm in length, with length being measured from front to back of the seat bottom 14, and in yet another embodiment 20 to 60 cm, however may be any suitable length. In at least one embodiment, the trenches 37 are generally 8 to 20 mm in height, with height being measured from upper surface 22 towards lower surface 24 of the cushion 20, and in yet other embodiments 10 to 15 mm, however may be any suitable height.

Figure 4:
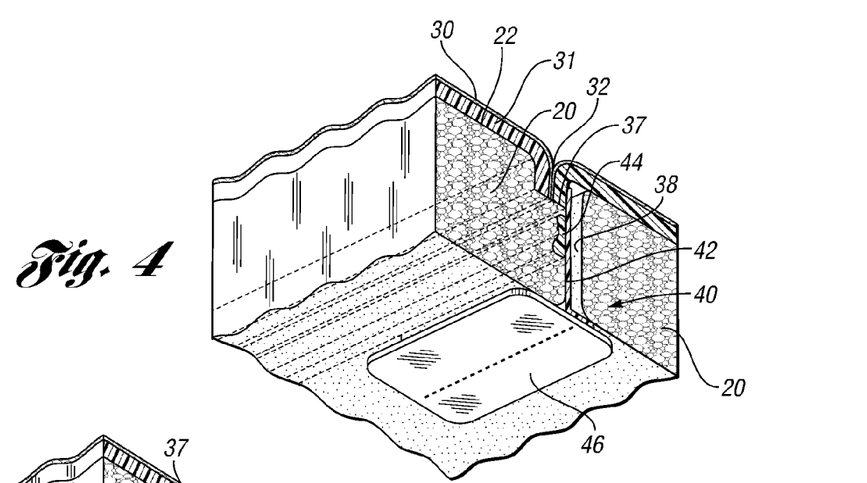
FIG. 4 is a sectional view taken along line 4-4 of FIG. 1 illustrating a first embodiment of a trim attachment assembly.
Figure 5:
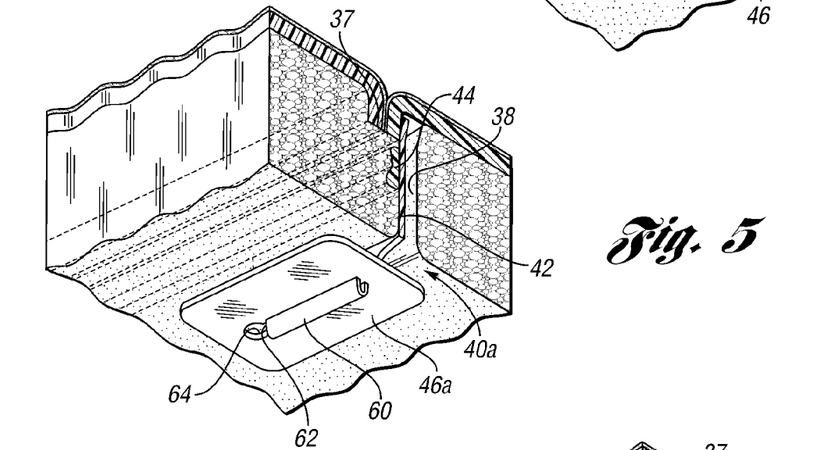
FIG. 5 is similar to FIG. 4 illustrating another embodiment of a trim attachment assembly.
Figure 6:
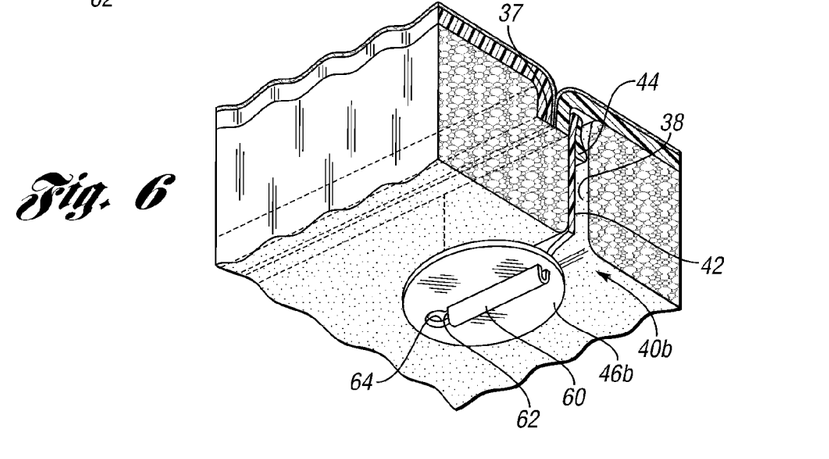
FIG. 6 is similar to FIG. 5 illustrating yet another embodiment of a trim attachment assembly.

As can be best understood in FIGS. 4-6, the cushion 20, in at least one embodiment, has a plurality of slots 38 in communication with a corresponding trench 37. The slots 38 can extend adjacent trench 37 as shown in FIG. 4, however, could alternatively extend from directly below trench 37. In at least one embodiment, the slots 38 may have a width of 0.5 to 8 mm, and in other embodiments of 0.75 to 6.5 mm, and in yet other embodiments of 1 to 5 mm, however they may be of any suitable width. As with the trenches 37, for clarity, the width of the slots 38 are shown enlarged but in should be understood that the slots 38 may be smaller and may be simply spread apart when needed since the cushion 20 is preferably made of a flexible foam material capable of such deformation. In at least one embodiment, the slots 38 are generally 2 to 8 cm in length, in other embodiments 2.5 to 5 cm in length, and in yet other embodiments 3 to 4 cm in length, however, may be any suitable length. In at least one embodiment, the height of the slots 38 are generally 10 to 50 mm, in other embodiments 15 to 40 mm, and in yet other embodiments 20 to 25 mm, however may be any suitable height. The slots 38 are spaced apart from each other in any suitable manner, but in at least one embodiment are spaced apart 100 to 175 mm, and in another embodiment in 120 to 140 mm. The cushion 20 could be formed with the trenches 37 and slots 38 molded therein or the trenches and slots could be formed in a post molding step or in any other suitable manner.

Figure 2:
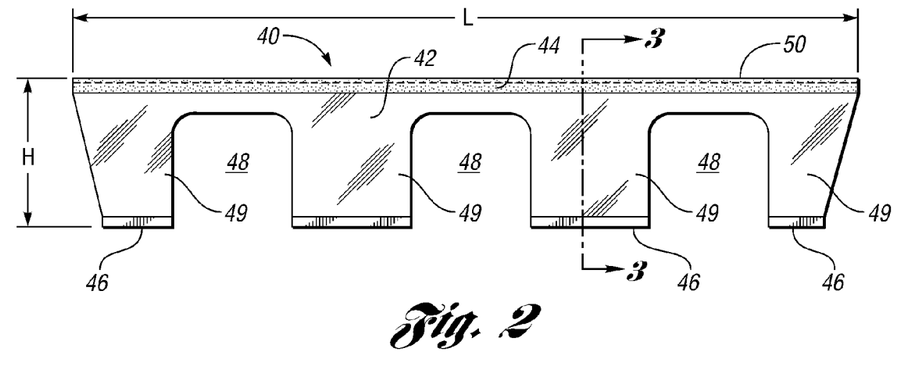
FIG. 2 is a plan view of a trim attachment assembly made in accordance with at least one embodiment of the present invention.
Figure 3:
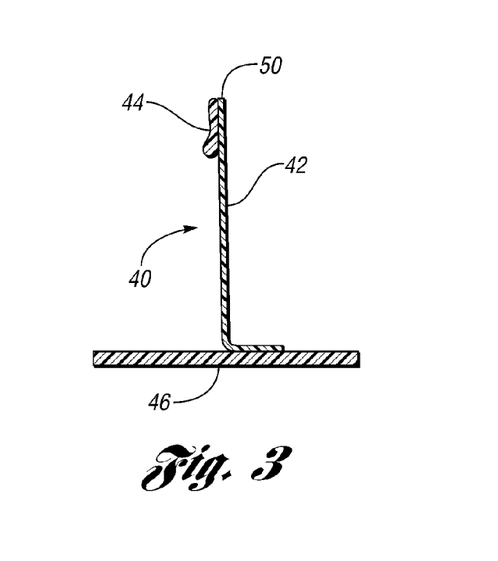
FIG. 3 is similar to FIG. 2 showing a side view of the trim attachment assembly.

Referring to FIG. 2, an embodiment of the trim attachment assembly 40 is shown. In at least this embodiment, the trim attachment assembly 40 comprises a carrier fabric 42. In at least the illustrated embodiment, the top end of the carrier fabric 42 has a beaded stiffener 44 attached thereto and the bottom end of the carrier fabric has a paddle stiffener 46 attached thereto. Both the beaded stiffener 44 and the paddle stiffener 46 can be attached to the carrier fabric 42 in any suitable manner. As shown in FIG. 2, the beaded stiffener 44 is stitched to the carrier fabric 42. However, any other suitable means such as ultrasonic welding, adhesive, etc. could be employed. Moreover, the beaded stiffener 44 could be integrally formed with the carrier fabric 42. Moreover, the paddle stiffener 46 could also be secured to the carrier fabric 42 in any suitable manner. Examples of such attachment mechanisms include stitching, ultrasonic welding, adhesives, etc. Stiffener 44 can be at the top edge 50 of carrier fabric 42 as shown in FIGS. 2-3 and 6 or below the top edge as shown in FIGS. 4 and 5. While the trim attachment assembly 40 is shown to include the beaded stiffener 42, it should be understood that the beaded stiffener could be omitted in certain embodiments.

The fabric carrier 42 could be made of any suitable material. In at least one embodiment, the carrier fabric is made of polypropylene. However, other types of materials such as fabric, or polymeric materials could be used. In at least one embodiment, the carrier fabric 42 has a height H, as measured from the top adjacent the optional beaded stiffener 44 to the bottom adjacent the paddle stiffener 46 of 25 to 75 mm, and in other embodiments of 40 to 50 mm, however any suitable height could be employed. In at least one embodiment, the carrier fabric 42 has a length L of four to eight feet, and in other embodiments of six feet, however it should be understood that any suitable length could be employed. In at least one embodiment, the carrier fabric 42 has a thickness of 0.25 to 3 mm, and in other embodiments of 0.5 to 2 mm, however, it should be understood that any suitable thickness could be employed.

As can be seen in FIG. 2, the carrier fabric 42 has a plurality of cutouts or scalloped sections 48. While a plurality of cutouts 48 are shown, it should be understood that more or less cutouts 48 than are shown, such as none, one, five, etc., could be employed. The cutout sections 48 can be spaced apart any suitable distance, but in at least one embodiment are spaced apart 100 to 175 mm, and in other embodiments of 120 to 140 mm. The cutout sections 48 can be any suitable size, but in at least one embodiment are 50 to 150 mm in length, and in other embodiments are 70 to 100 mm. These sections 48 are provided to help reduce the cost and weight of the trim attachment assembly 40. The sections 48 also help to improve the flexibility of the carrier fabric 42. By virtue of the cutout sections 48, primary attachment segments 49 remain. In at least one embodiment, each primary attachment segment 49 is roughly 25 to 75 mm in length, and in other embodiments 40 to 55 mm, however could be any suitable length.

The paddle stiffener 46 can have any suitable size or shape. Moreover, the paddle stiffener 46 can be made of any suitable material such as polypropylene. However, it could also be made of other polymeric and non-polymeric materials. As best shown in FIG. 4, the paddle stiffener 46 of the illustrated embodiment is relatively flat and thin. For instance, the paddle stiffener 46 may have a thickness on the order of 0.5 to 2.5 mm, and in other embodiments of 1.25 to 1.75 mm. Again, while any suitable shapes or size paddle stiffener 46 could be employed, exemplary paddle stiffeners are rectangular, as shown in FIG. 4 and have widths on the order of 25 to 35 mm and lengths on the order of 60 to 70 mm. Moreover, while shown to be relatively flat, the paddle stiffeners 46 could be any suitable shape.

As shown in the illustrated embodiment, the trim attachment 40 has multiple spaced apart paddle stiffeners 46, with each primary attachment segment 49 terminating with one paddle stiffener 46, however it can be envisioned that each segment 49 may terminate with more than one paddle stiffener 46. The paddle stiffeners 46 can be spaced apart any suitable distance, but in at least one embodiment are spaced apart 100 to 175 mm, and in other embodiments of 120 to 140 mm. Moreover, the paddle stiffener 46 can have varying lengths, but are typically 40 to 65 mm in length. The paddle stiffeners 46 can have varying widths, but are typically 20 to 25 mm in width. Furthermore, rather than having spaced paddle stiffeners 46, each trim attachment assembly 40 could have one paddle stiffener 46.

As discussed above, beaded stiffener 44 is optional. However, in embodiments where the beaded stiffener 44 is provided, the beaded stiffener 44 is preferably attached a relatively short distance, such as 7.5 to 25 mm, and in other embodiments 10 to 15 mm, below the top edge 50 of the carrier fabric 42. The beaded stiffener 44 can have any suitable shape or size. In at least one embodiment, the beaded stiffener 44 is shown to have a kidney shape, however, the beaded stiffener 44 could also have bulbous, planar, square, circular and/or cylindrical shapes, among other shapes. In at least one embodiment, the beaded stiffener 44 can be generally rectangular shaped, which can be particularly helpful in reducing scalloping in certain instances. As shown in the illustrated embodiments, the beaded stiffener 44 is provided on only one side of the carrier fabric 42. However, it should be understood that the beaded stiffener 44 could be provided on both sides of the carrier fabric 42. Moreover, while the illustrated embodiments show that the beaded stiffener 44 extends along the entire length of the carrier fabric 42, it should be understood that the beaded stiffener 44 could extend along less than the entire length of the carrier fabric 42, such as on the same line as the paddle stiffeners 46. For instance, the beaded stiffener 44 could be 40 to 65 mm in length and spaced 100 to 175 mm apart.

When the beaded stiffener 44 is employed, as best shown in FIG. 4, it rests below the trim seam 32 of the trim cover 30. The beaded stiffener 44 helps to provide strength and rigidity across the length of the trim seam 32 and helps to equally disperse the tension on the trim seam to provide an improved appearance. As can be seen in FIG. 4, the trim seam 32 includes opposite ends of the trim cover 30 and foam 31. The portion of the trim seam 32 housed within the trench 37 is typically referred to as selvage.

As can best be seen in FIGS. 4-6, in use, the upper edge of the carrier fabric 42 is attached to the trim seam 32. This attachment can be done by stitching, adhesive, ultrasonic and/or vibration welding, and/or by any other suitable means.

Referring to FIG. 5, an alternative embodiment of a trim attachment assembly 40 is illustrated. The trim attachment assembly 40a is similar to the trim attachment assembly illustrated in FIG. 3 except that the second end of the carrier fabric 42 has a molded bead 60 thereat. The molded bead 60 can be made of any suitable material and can be secured to the carrier fabric 42 by any suitable means such as by stitching, welding, adhesive, etc. The molded bead 60 can be any suitable shape and/or size. In at least one embodiment, the molded bead 60 has a width of 1 to 8 mm, and in other embodiments of 3 to 6 mm, however may be any suitable width. The paddle stiffener 46*a* is similar in size and shape to sizes and shapes discussed above with respect to paddle 46 however, paddle 46*a* includes a slot 62 and a hole (or portion of a hole) 64, connected with the slot 62. The slot 62 and hole 64 can be any suitable shape and size. For instance, in at least one embodiment they are sized 40 to 65 mm and 3 to 15 mm in length, respectively, and 1 to 2 and 4 to 8 mm in width, respectively, however may be any suitable size. The bead 60 can be slid into and out of the slot and hole 62, 64 for selective securement thereto.

Referring to FIG. 6, a third embodiment of a trim attachment assembly is illustrated and referred to as 40*b*. The trim attachment assembly 40*b* is similar to the trim assembly 40*a* except that the paddle stiffener 46*b* has a different shape than the paddle stiffener 46*a*. In the embodiment illustrated in FIG. 6, the paddle stiffener 46*b* has a circular shape. Again, any suitable shape can be used such as rectangular, square, star, circle, etc. Furthermore, the bead 44 is shown molded to carrier fabric 42 in this embodiment.

Figure 7A:
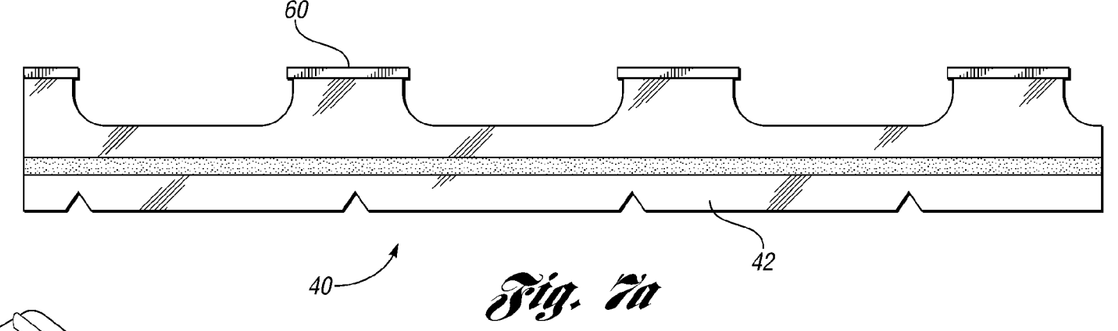
FIGS. 7*a*, 7*b* and 7*c* are various views of various components of another embodiment.
Figure 7B:
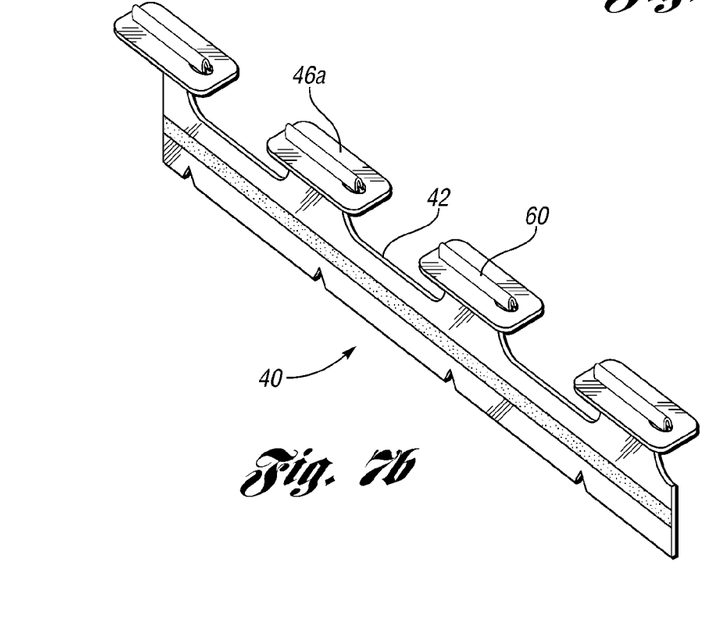
Figure 7C:
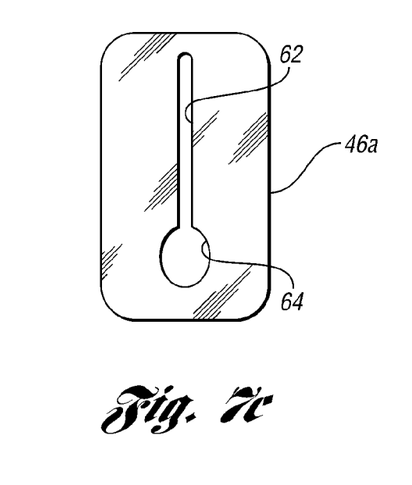

Referring to FIGS. 7*a*, 7*b* and 7*c*, different views of a trim attachment 40 and its components, along with some representative dimensions are shown. Of course it should be understood that the dimensions may vary as needed.

The operation and assembly of the trim attachment assembly 40 will now be described. The trim cover 30 is preferably provided above the upper surface 22 of the cushion with the upper end of the carrier fabric 42 attached thereto. In embodiments where the beaded stiffener 44 is provided, the beaded stiffener is disposed below the trim seam 32. The paddle stiffener 46 is slid through the trench 37 and slot 38 until it extends past the lower surface 24 of the cushion assembly. The paddle stiffener 46 is then pivoted to its holding position as shown in FIGS. 4-6. While this can be done typically by a person using his fingers to push the carrier fabric 42 and the paddle bead 46 through the trench 37 and slot 38, tools and/or other devices could be used to aid or instead of a manual operator. In an alternative embodiment, paddle stiffeners 46*a* and 46*b* could be installed after the molded bead 60 has been disposed adjacent to the bottom surface 24.

Moreover, while the components 42, 44 (if provided) and 46 can be made of any suitable materials, in at least one embodiment they are preferably made of the same material. In at least this embodiment, one suitable material is polypropylene. However, other suitable materials could be envisioned.

While exemplary embodiments are described above, it is not intended that these embodiments describe all possible forms of the invention. Rather, the words used in the specification are words of description rather than limitation, and it is understood that various changes may be made without departing from the spirit and scope of the invention. For instance, it should be understood that for components or characteristics having multiples, such as the trenches, the slots, and the spacing, each of such component or characteristic can be similarly dimensioned or independently varyingly dimensioned. Additionally, the features of various implementing embodiments may be combined to form further embodiments of the invention.

What is claimed is:

1. A seat cushion assembly for a vehicle, the cushion assembly comprising:
    a foam cushion having an "A" surface, a "B" surface, and at least one slot extending therebetween;
    a trim cover extending over the foam cushion; and
    a trim cover attachment assembly secured to the trim cover for securing the trim cover adjacent the foam cushion, the trim cover attachment assembly comprising a flexible sheet having a first end, a second end and an intermediate portion extending between and connecting the first and second ends, the first end being attached to the trim cover, the first end and the intermediate portion being disposed within the slot, the second end being disposed adjacent the "B" surface outside of the slot and having a paddle that sits flush against the "B" surface of the foam cushion, the paddle being attached to the second end of the flexible sheet, and the second end of the flexible sheet having a bead secured thereto, the bead having a first width, the paddle having a planar body portion having a paddle slot having a first portion in communication with a second portion, the first portion having a second width and the second portion having a third width, the third width being bigger than the first width and the second width and the first width being bigger than the second width but smaller than the third width.

2. The cushion assembly of claim 1 wherein the paddle is secured directly to the second end of the flexible sheet.

3. The cushion assembly of claim 1 wherein the slot is 0.5 to 8 mm wide and the cushion has a trench 2 to 12 mm wide in communication with the slot, the trim cover having selvage disposed within the trench.

4. The cushion assembly of claim 1 wherein the trim cover attachment assembly comprises a first trim cover attachment assembly secured to the trim cover at a first location, the cushion assembly further comprising a second trim cover assembly secured at a second location, the second location being spaced from the first location, the second trim cover assembly comprising a flexible sheet having a first end attached to the trim cover and a second end having a paddle that sits adjacent the "B" surface of the foam cushion, the flexible sheet extending through a second slot of the foam cushion.

5. A trim cover assembly securable to a seat cushion assembly for a vehicle, the cushion assembly comprising a foam cushion having an "A" surface, a "B" surface, and at least one slot extending therebetween and a trench in communication with the slot, the trim cover assembly comprising:
    a trim cover extendable over the foam cushion; and
    a trim cover attachment assembly secured to the trim cover for securing the trim cover adjacent the foam cushion, the trim cover attachment assembly comprising a flexible sheet having a first end attached to the trim cover and a second end having a paddle that, when the trim cover is secured adjacent the foam cushion, sits against the "B" surface of the foam cushion, with the flexible sheet extending through the slot of the foam cushion, wherein the second end of the flexible sheet has a bead secured thereto, the bead having a first width, the paddle having a planar body portion having a paddle slot having a first portion in communication with a second portion, the first portion having a second width and the second portion having a third width, the third width being bigger than the first width and the second width, and the first width being bigger than the second width but smaller than the third width.

6. The trim cover assembly of claim 5 wherein the paddle is attached to the second end of the flexible sheet.

7. The trim cover assembly of claim 6 wherein the paddle is secured directly to the second end of the flexible sheet.

8. The trim cover assembly of claim 5 wherein the trim cover attachment assembly comprises a first trim cover attachment assembly secured to the trim cover at a first location, the cushion assembly further comprising a second trim cover assembly secured at a second location, the second location being spaced from the first location, the second trim cover assembly comprising a flexible sheet having a first end attached to the trim cover and a second end having a paddle that sits against the "B" surface of the foam cushion, the flexible sheet extending through a second slot of the foam cushion.

9. A method of attaching a trim cover to a foam cushion, said method comprising:
   providing a foam cushion having an "A" surface, a "B" surface, and at least one slot extending therebetween;
   providing a trim cover having an underside and a top side;
   providing a trim cover attachment assembly comprising a flexible sheet having a first end, a second end, an intermediate portion extending between and connecting the first and second ends, and paddle adjacent the second end of the flexible sheet, the paddle being attached to the second end of the flexible sheet, and the second end of the flexible sheet having a bead secured thereto, the bead having a first width, the paddle having a paddle slot having a first portion having a second width and a second portion having a third width, the third width being bigger than the first width and the second width and the first width being bigger than the second width but smaller than the third width;
   securing the first end of the flexible sheet to the underside of the trim cover;
   displacing the flexible sheet through the slot so that the second end of the flexible sheet extends out of the slot adjacent the "B" surface; and
   disposing the paddle on the "B" surface of the foam cushion such that the flexible sheet extends between the trim cover surface and the "B" surface of the foam cushion.

10. The method of claim 9 wherein the paddle is secured directly to the second end of the flexible sheet.

11. The method of claim 9 wherein the slot is 0.5 to 8 mm wide.

12. The method of claim 9 wherein the trim cover attachment assembly comprises a first trim cover attachment assembly secured to the trim cover at a first location, the cushion assembly further comprising a second trim cover assembly secured at a second location, the second location being spaced from the first location, the second trim cover assembly comprising a flexible sheet having a first end attached to the trim cover and a second end having a paddle that adjacent the "B" surface of the foam cushion, the flexible sheet extending through a second slot of the foam cushion.

13. The method of claim 9 wherein the step of displacing the flexible sheet through the slot comprises passing the flexible sheet and the paddle through the slot and the step of disposing the paddle on the "B" surface comprises rotating the paddle after it passes through the slot to allow the paddle to sit against the "B" surface.

14. The method of claim 9 wherein the step of displacing the flexible sheet through the slot comprises passing the flexible sheet and the bead through the slot and the step of disposing the paddle on the "B" surface comprises passing the bead through the second portion of the paddle slot and displacing the bead against the first portion of the paddle slot and the paddle.

* * * * *

UNITED STATES PATENT AND TRADEMARK OFFICE
CERTIFICATE OF CORRECTION

| | | |
|---|---|---|
| PATENT NO. | : 8,814,267 B2 | Page 1 of 1 |
| APPLICATION NO. | : 13/510389 | |
| DATED | : August 26, 2014 | |
| INVENTOR(S) | : Thomas A. Welch, Sr. et al. | |

It is certified that error appears in the above-identified patent and that said Letters Patent is hereby corrected as shown below:

In the Claims

Column 10, Line 15, Claim 12:

After "having a paddle"
Delete "that".

Signed and Sealed this
Twenty-third Day of December, 2014

Michelle K. Lee
*Deputy Director of the United States Patent and Trademark Office*